United States Patent [19]

Simons

[11] Patent Number: 4,487,736

[45] Date of Patent: Dec. 11, 1984

[54] METHOD FOR FORMING A HAND-HEWN LOOK ON A LAMINATE

[76] Inventor: Clay G. Simons, 1701 N. 21st, Boise, Id. 83702

[21] Appl. No.: 340,184

[22] Filed: Jan. 18, 1982

[51] Int. Cl.³ ............................................. B29C 17/02
[52] U.S. Cl. ..................................... 264/295; 156/61; 156/184; 264/321; 264/339; 493/462; 493/968; 493/955
[58] Field of Search ................ 53/430, 117; 493/461, 493/462, 464, 467, 968, 955; 156/220, 61, 183, 184, 76; 264/139, 339, 293, 295; 428/319.3, 511, 537

[56] References Cited

U.S. PATENT DOCUMENTS

| | | | |
|---|---|---|---|
| 368,493 | 8/1887 | Roosa | 156/71 |
| 1,464,604 | 8/1923 | Hall | 428/143 |
| 1,829,262 | 10/1931 | Cade | 156/183 |
| 2,295,891 | 9/1942 | Copeman | 156/183 |
| 2,377,042 | 5/1945 | Rosenthal | 428/398 |
| 2,496,122 | 1/1950 | Donahue | 428/142 |
| 2,959,511 | 11/1960 | Finger | 156/183 |
| 2,969,301 | 1/1961 | Finger | 264/112 |
| 3,521,424 | 7/1970 | Wirfel | 53/430 |
| 3,769,129 | 10/1973 | Williams | 156/220 |
| 3,860,469 | 1/1975 | Gregorian et al. | 156/83 |
| 3,964,232 | 6/1976 | Bender et al. | 53/430 |
| 4,052,236 | 10/1977 | Kapasi et al. | 156/85 |

*Primary Examiner*—R. L. Spruill
*Assistant Examiner*—Donald R. Studebaker
*Attorney, Agent, or Firm*—Kolisch, Hartwell, Dickinson & Anderson

[57] ABSTRACT

A method of producing a hand-hewn look in a false wood beam. The beam is formed from a planar laminate composed of a foam core sandwiched between an outer cover and an inner multiply paper backing. The laminate is rolled along its length, with the outer cover on the outside of the roll, to produce creases in the laminate along irregular, longitudinally spaced lines. These creases create irregular surface facets which, with the laminate unrolled, appear as irregular cutting planes in the laminate's outer cover.

3 Claims, 5 Drawing Figures

METHOD FOR FORMING A HAND-HEWN LOOK ON A LAMINATE

BACKGROUND AND SUMMARY

The present invention relates to a simulated wood beam article, and in particular, to a method of producing such an article having a hand-hewn surface look.

A popular home decorator concept involves mounting hollow, simulated wood beams on the ceiling or walls of a room to give the room the look of having natural wood beam supports. One type of false beam known in the prior art is formed from an elongate planar laminate by folding the same along a series of pre-creased longitudinal lines to produce a beam-shaped structure. This structure has a smooth-surfaced wood grain appearance resembling a smooth-surfaced wood beam. For some home decorator settings, a false wood beam having a faceted, hand-hewn look may be more compatible with the room decor.

Planar laminates used in forming false beam structures of the type just described are supplied in lengths corresponding to the lengths of the desired beams, which typically may be eight feet or more. At the retail level, longer-length conventional laminates are generally difficult to handle, and to transport in small vehicles.

One general object of the present invention is to provide a method of producing a hand-hewn look in a hollow beam structure of the type described above, wherein such look is achieved by pre-rolling of this structure.

Another object of the invention is to provide by such a method an article which can be supplied in a rolled-up form which is easily and conveniently handled and transported.

The invention contemplates a method of producing a hand-hewn look in a false wood beam which is formed from a planar web. In practicing the invention, the web is rolled up to produce creases in the web which extend substantially transversely of the direction of rolling. The creases create irregular surface facets which, with the web unrolled, appear as irregular cutting planes in the web's outer surface.

These and other objects and features of the present invention will become more fully apparent when the following detailed description of a preferred embodiment of the invention is read in conjunction with the accompanying drawings.

DETAILED DESCRIPTION OF THE INVENTION

Figure 1:
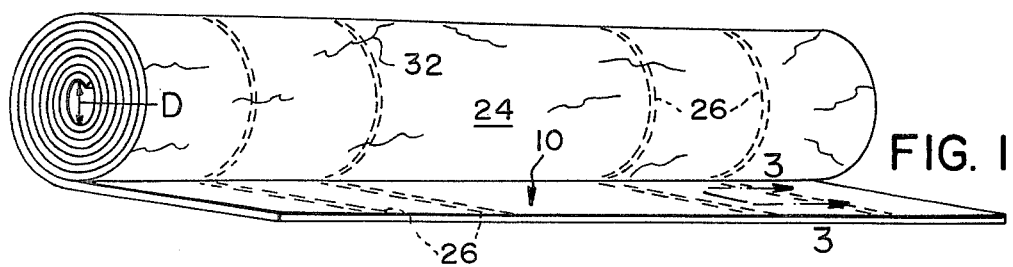
FIG. 1 is a perspective view of a web which is rolled up in accordance with the method of the invention.
Figure 3:
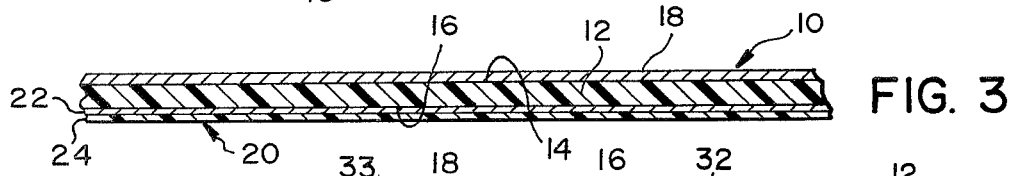
FIG. 3 is an enlarged, fragmentary, sectional view taken generally along line 3—3 in FIG. 1.

FIG. 1 shows in perspective view an elongate laminate, or web, 10, a portion of which has been rolled up in accordance with the method of the invention. The composition and appearance of laminate 10, as such appears in its planar form prior to being rolled up, is illustrated sectionally in FIG. 3. The laminate is composed of a polymeric foam core mat 12 having opposite sides 14, 16 which correspond to upper and lower sides, respectively, in FIG. 3. The mat has a substantially uniform thickness.

A cardboard backing 18 is laminated to side 14 of mat 12. Backing 18 is a multi-ply paper backing which forms permanent creases, or fold lines, when bent beyond the limits of its resilience. Laminated to side 16 of the mat is an outer cover 20 which is composed of an inner multi-ply paper layer 22 and an outer vinyl sheet 24 bonded to layer 22. The vinyl sheet has a simulated wood grain pattern. The thickness of the laminate just described preferably is between about one-eighth and three-sixteenths inch.

Referring again to FIG. 1, laminate 10 is formed conventionally as a rectangular planar article having a preferred width dimension, between its left and right edges in FIG. 1, of about sixteen inches, and a typical length of between about eight and twelve feet. The laminate is precreased along four longitudinally extending fold lines, such as lines 26, in FIGS. 1 and 5. These fold lines permit the planar laminate to be folded up to form a box-like hollow beam structure adapted to be mounted against the surface of a ceiling or the like. A beam structure formed by folding up laminate 10 is indicated at 28 in FIG. 5, and is shown in this figure mounted against a ceiling surface 30.

Figure 4:
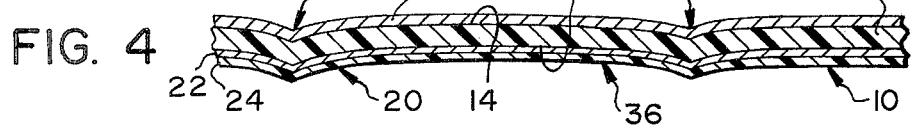
FIG. 4 is a fragmentary sectional view taken generally along line 4—4 in FIG. 2, with the web's outer side facing downwardly, as in FIG. 3.

Considering now the method of the present invention, laminate 10, with such in its planar form, is placed face-down—i.e. with its backing exposed—on a suitable support surface. The laminate is then tightly rolled longitudinally (in the direction of the fold lines) with the vinyl sheet on the outside of the roll. This rolling creates a surface area differential between the inner backing and the outer cover in the web which produces creases in the laminate. FIG. 4 shows a pair of creases 32, 33 formed by such rolling. Because of the stiff, relatively nonresilient nature of the laminate, the creases so formed are substantially permanent; that is, the relief characteristics of the creases are preserved when the laminate is rolled out into planar form.

Figure 2:
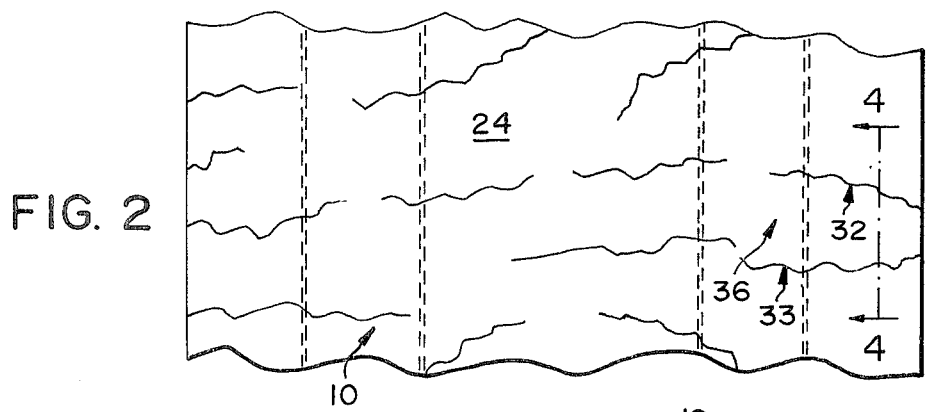
FIG. 2 illustrates, in fragmentary plan view, facet-like surface features produced in the web by the method of the invention.

As seen in FIGS. 1 and 2, the creases formed in the mat by rolling are irregular, and extend substantially transversely of the direction of rolling. The creases may extend from one side of the laminate to the other, or only partially across the laminate. In practicing the invention, a roll diameter is selected which, to make the particular beam shown herein, produces crease lines having intercrease spacings, in the direction of roll, of between about two and eight inches. In the particular embodiment described herein, where laminate 10 has a thickness of between about one-eighth and three-sixteenths inch, such spacings are achieved by rolling the mat with an inner diameter, designated at D in FIG. 1, of about one inch.

Figure 5:
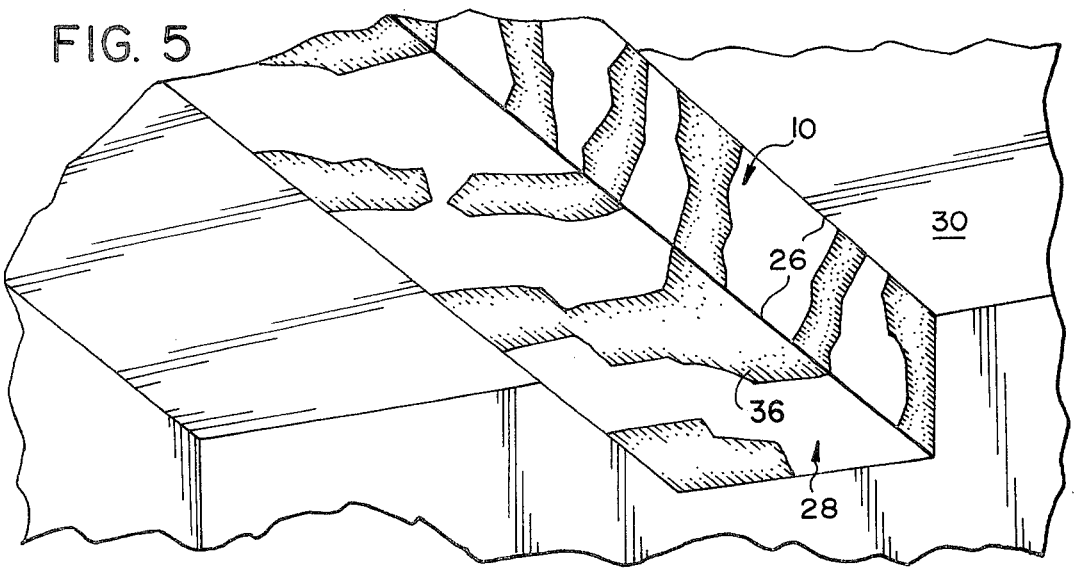
FIG. 5 is a perspective view of a portion of a hollow false beam structure having a hand-hewn surface look produced according to the method of the invention.

It can be appreciated with reference to FIGS. 2 and 4 that pairs of adjacent creases, such as creases 32, 33, define therebetween irregular, edge-concave surface facets, such as facet 36, in the outer surface (the vinyl sheet) of the laminate. According to an important feature of the present invention, when the web is rolled out in planar form, the surface facets give the appearance of irregular cutting planes similar to the surface topography in a hand-hewn wooden beam. This effect is particularly striking when the laminate is folded into a hollow beam structure and mounted against a wall or ceiling, as shown in FIG. 5.

The method of the present invention provides several advantages to builders and home decorators. By the method of the invention, a planar web using in forming a false beam structure can easily and inexpensively be modified to produce irregular surface features which simulate the irregular cutting planes in a hand-hewn wooden beam. The method thus provides more decor versatility where fold-up, false wood beams are used. Another advantage is that the laminate, once rolled up into the relatively tight, compact form shown in FIG. 1, can be easily handled and transported. The rolled laminate, having less of its surface exposed during handling and shipping, is also less susceptible to surface marring.

While a preferred embodiment of the invention has been described herein, it will be appreciated that various changes and modifications may be made without departing from the spirit of the invention.

It is claimed and desired to secure by Letters Patent:

1. A method of forming a hand-hewn surface topography in one side of a planar laminated web having a compressible core mat sandwiched between and bonded to layers of substantially non-resilient, crease-retaining material, said method comprising
    rolling the web sufficiently tightly to produce irregular creases in the web extending substantially transversely of the direction of said rolling,
    unrolling the web, and
    by said rolling and unrolling, generating irregular surface facets in the web which appear as irregular cutting planes in the web's one side.

2. A method of forming a hand-hewn surface topography in an elongate, planar, relatively non-resilient laminate which includes a compressible foam core mat having a substantially uniform thickness sandwiched between and bonded to layers of substantially non-resilient, crease-retaining material, and a facing sheet bonded to one of the layers said method comprising
    rolling the laminate along its length, with the facing sheet on the outside thereof, sufficiently tightly to produce irregular creases in the laminate extending substantially transversely of the direction of said rolling,
    unrolling the web, and
    by said rolling and unrolling, generating irregular surface facets in the laminate which appear as irregular angulated planes in the laminate's facing sheet.

3. The method of claim 2, wherein said laminate has a thickness of about one-eighth inch and the laminate is rolled to have an inner diameter of about one inch.

* * * * *